Sept. 3, 1968 W. F. DELP 3,399,593
PRECISION ARTWORK DUPLICATING MACHINE
Filed May 14, 1965 5 Sheets-Sheet 1

INVENTOR.
WINNER F. DELP
BY
ATTORNEYS.

Sept. 3, 1968 W. F. DELP 3,399,593
PRECISION ARTWORK DUPLICATING MACHINE
Filed May 14, 1965 5 Sheets-Sheet 2

INVENTOR.
WINNER F. DELP
BY
Seidel & Gonda
ATTORNEYS.

Sept. 3, 1968 W. F. DELP 3,399,593
PRECISION ARTWORK DUPLICATING MACHINE
Filed May 14, 1965 5 Sheets-Sheet 4

INVENTOR.
WINNER F. DELP
BY
Seidel & Gonda
ATTORNEYS.

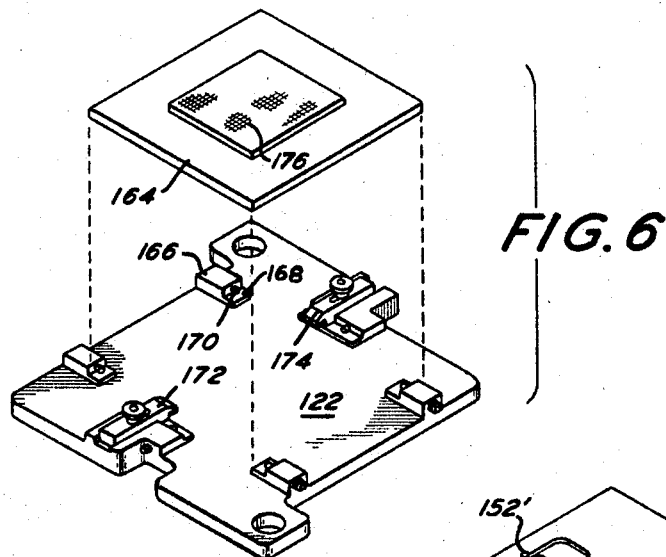
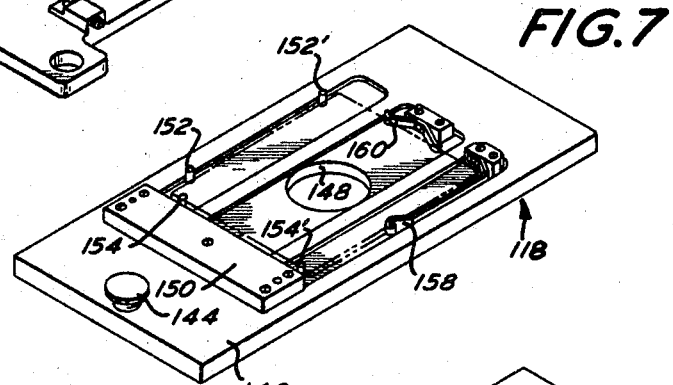
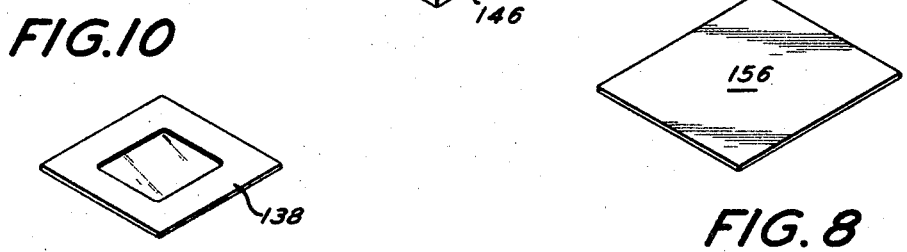
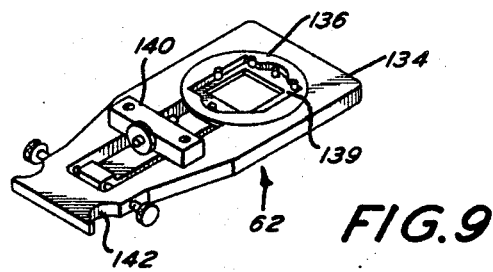

United States Patent Office 3,399,593
Patented Sept. 3, 1968

3,399,593
PRECISION ARTWORK DUPLICATING
MACHINE
Winner F. Delp, Fort Washington, Pa., assignor to The
Jade Corporation, Bethayres, Pa., a corporation of
Pennsylvania
Filed May 14, 1965, Ser. No. 455,857
13 Claims. (Cl. 88—24)

ABSTRACT OF THE DISCLOSURE

A positioning machine using a fixed optical axis to position a movable stage and a reticle in a microscope acting as a fixed reference point while a stage is shifted on coordinate axes until a line or lines on a master pattern are aligned with the reticle. Photosensitive material is positioned on the stage and selectively exposed to projected images by a reduction printer which is prealigned on the optical axis of the reticle.

---

This invention relates to a precision artwork duplicating machine, and more particularly, to a machine for duplicating any number of artwork patterns with identical accuracy and with a higher degree of accuracy than known heretofore in connection with like machines. Also, the machine of the present invention facilitates the duplication of any particular artwork pattern repetitively with a high degree of accuracy.

The machine of the present invention is adapted to reproduce and/or duplicate artwork which is orientated with respect to a master pattern with identical accuracy up to plus or minus 10 microinches. The master pattern and the artwork are orientated and focusing on the master pattern is preferably accomplished by use of a microscope. The artwork is preferably associated with a reduction printer located below and facing upwardly toward the sensitive surface of a negative.

The precision artwork may assume a wide variety of configurations and is adapted for a wide variety of uses. One use of the artwork is to provide a miniaturized printed circuit thereon. By means of the present invention, the miniaturized printed circuit may be repetitively reproduced with each circuit being disposed adjacent to the next circuit on the negative. Other types of artwork and uses for the present invention will be readily apparent to those skilled in the art to which the present invention pertains.

It is an object of the present invention to provide a novel precision artwork duplicating machine for producing artwork orientated with respect to a master pattern.

It is another object of the present invention for providing apparatus capable of duplicating artwork with identical accuracy and/or error.

It is another object of the present invention to provide a precision artwork machine wherein any error is constant for all reproductions.

Other objects will appear hereinafter.

For the purpose of illustrating the invention, there is shown in the drawings a form which is presently preferred; it being understood, however, that this invention is not limited to the precise arrangements and instrumentalities shown.

FIGURE 6 is an exploded perspective view of the master pattern and its support.

FIGURE 7 is a perspective view of the negative support.

FIGURE 8 is a perspective view of the negative.

FIGURE 9 is a perspective view of an artwork support.

FIGURE 10 is a perspective view of a slide containing the artwork to be reproduced.

Referring to the drawing in detail, wherein like numerals indicate like elements, there is shown in FIGURE 1 a front elevation view of the machine of the present invention designated generally as 10.

The machine 10 may include a generally horseshoe shaped base having a recess extending from edge thereof. A support frame 16 is mounted on the base or any other stable surface by means of a plurality of corner posts 20. The frame 16 is provided with a recess 18 similar to and superimposed over the base recess. If desired, the base and frame 16 may be made integral as a one-piece unit.

Figure 1:
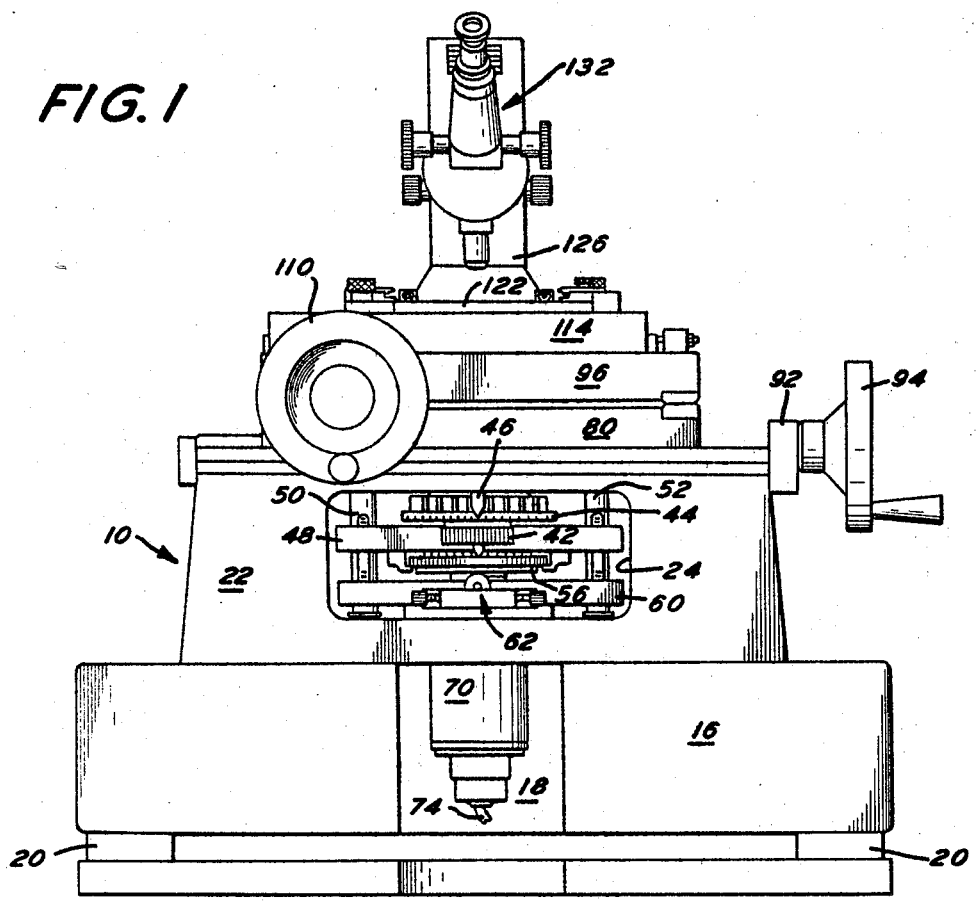
FIGURE 1 is a front elevation view of the machine of the present invention.

A main frame 22 is supported by the upper surface of the frame 16. As shown more clearly in FIGURE 4, the main frame 22 is a hollow member having its open end juxtaposed to the frame 16. Frame 22 has a centrally disposed hub 26 and an access opening 24. Opening 24 is shown more clearly in FIGURES 1 and 3. Bolts 28 and 28', or other equivalent structure may be utilized to releasably secure the frame 22 to the frame 16.

Figure 4:
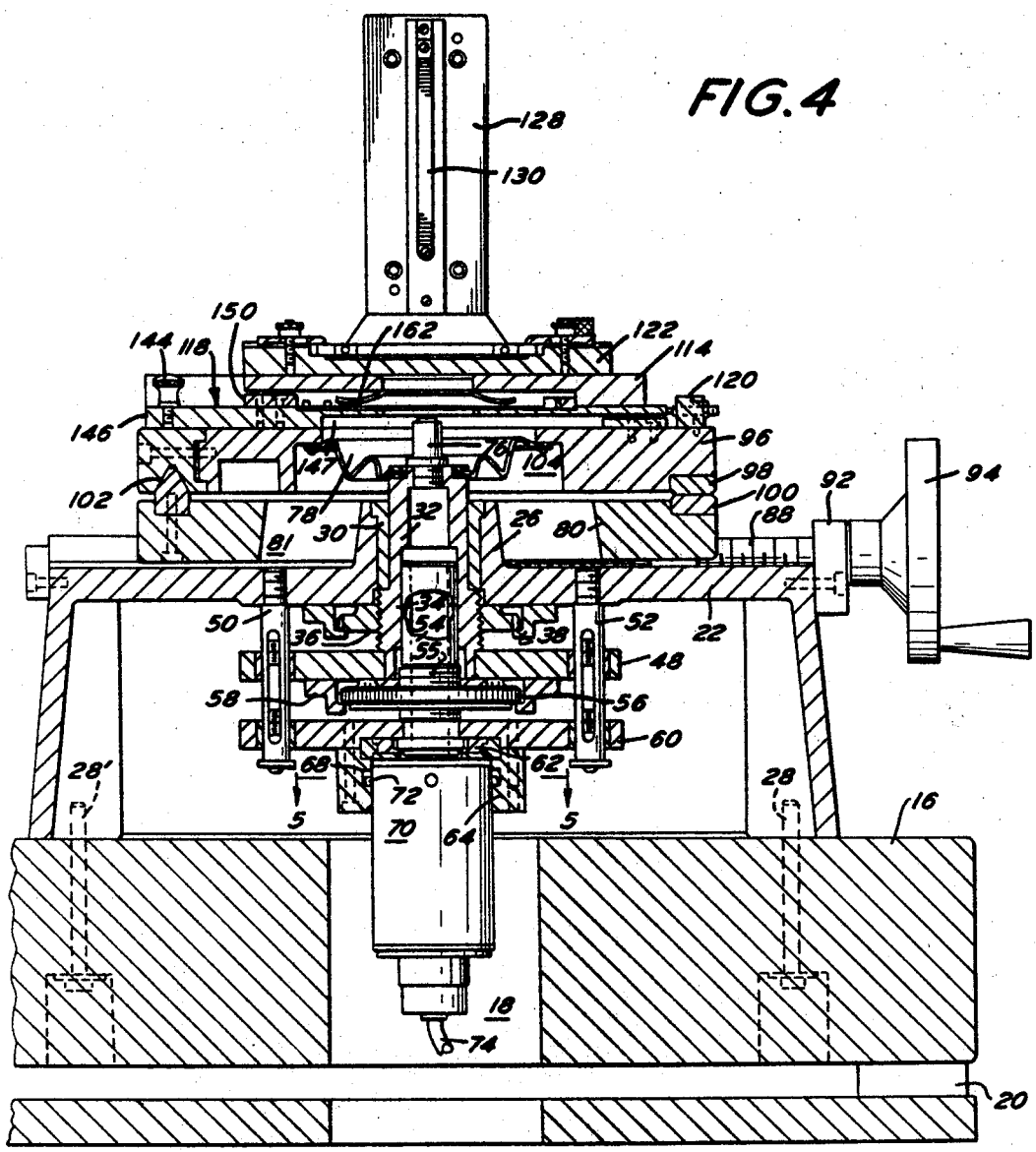
FIGURE 4 is a sectional view taken along the line 4—4 in FIGURE 2.

As shown more clearly in FIGURE 4, a sleeve bearing 30 is disposed within the hub 26. Bearing 30 slidably receives a hollow shaft 32 having an enlarged diameter threaded portion 34 at its lower end. Portion 34 abuts against one end of bearing 30 in the uppermost position of shaft 32 as illustrated. A gear 36 is provided having threads on its inner periphery meshed with threads on the outer periphery of portion 34. A bracket means 38 is provided to retain the gear 36 juxtaposed to the inner surface of the horizontally disposed wall of the frame 22. Hence, the gear 36 is disposed only for rotary motion.

Figure 3:
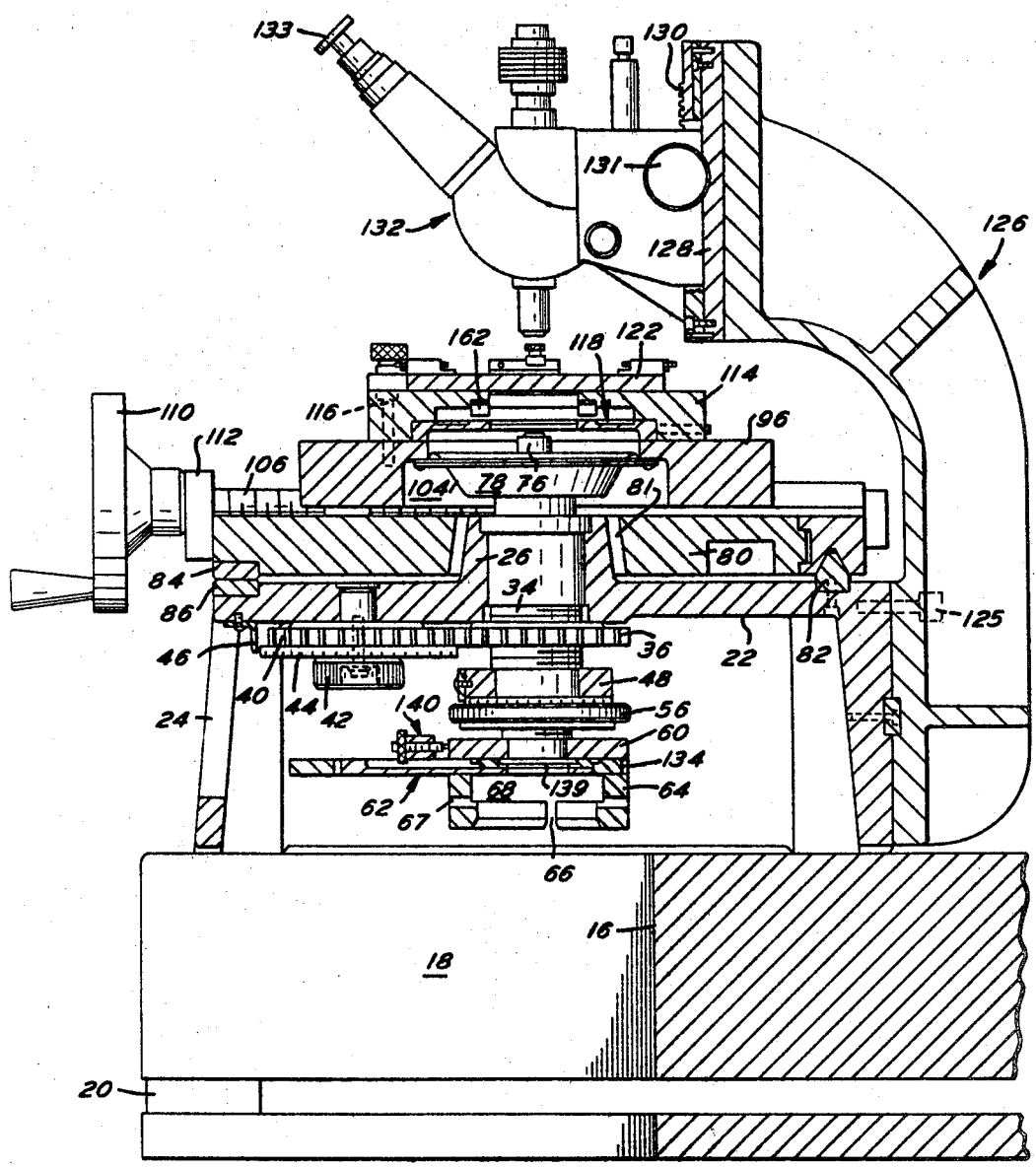
FIGURE 3 is a sectional view taken along the line 3—3 in FIGURE 2.

As shown more clearly in FIGURE 3, gear 36 is meshingly engaged with a gear 40. Gear 40 is suitably journaled in the horizontally disposed wall of the frame 22. A suitable manually operable knob 42 is provided for rotating gear 40 which in turn will rotate gear 36 to effect ar raising or lowering of the shaft 32. A suitable graduated scale 44 is mounted for rotation with the gear 40 and a pointer 46 is supported by the main frame 22 adjacent the outer periphery of scale 44.

A first plate 48 is supported by the lower end of shaft 32 below the enlarged diameter portion 34. Plate 48 is provided with apertures at opposite ends which are provided with bearings. A pair of guide rod members 50 and 52 are supported by the horizontally disposed wall of the main frame 22 in depending relation. Each of the members 50 and 52 extend through one of the bearings in the member 48. The relationship between the member 48 and the members 50 and 52 assures that the shaft 32 will not rotate, but rather will be mounted for up and down reciprocatory movement.

A shaft 54 is telescoped within and slidably guided by the inner surface wall of shaft 32. The lower end of shaft 54 is provided with external threads 55. Threads 55 are in meshing enagement with threads on the inner surface of an adjusting wheel 56. Adjusting wheel 56 is supported by brackets 58 dependent from the lowermost surface of plate member 48. The only relative motion between hand wheel 56 and plate member 48 is rotary motion of the former with respect to the latter. Thus, hand wheel 56 will move up and down with the plate member 48.

A second plate 60 is secured to the lowermost end of shaft 54. The guide rod members 50 and 52 extend through corresponding openings in plate member 60 so that the latter is guided only for up and down reciprocatory type movement. Adjustment of hand wheel 56 will effect up and down movement of plate member 60 toward and away from plate member 48. Rotation of knob 42 will effect up and down movement of plate members 48 and 60 as a unit.

A mounting block 64 is coupled to plate member 60 by bolts or the like. An artwork support structure designated generally as 62 is slidably supported within mating grooves on the member 60 and block 64. Structure 62 is shown more clearly in FIGURE 9 and will be discussed in detail hereinafter.

Figure 5:
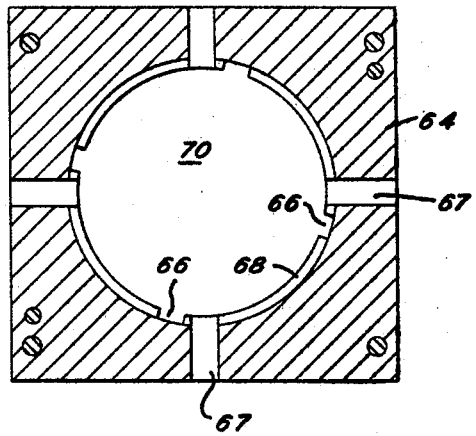
FIGURE 5 is a sectional view taken along the line 5—5 in FIGURE 4.

The mounting block 64 is provided with a centrally located aperture and a plurality of circumferentially disposed axially directed slots 66. See FIGURES 3 and 5. The slots 66 terminate at a shoulder defining a groove 68 within the mounting block 64. A reduction printer 70 is provided having radially outwardly directed projections 72 corresponding in number to the number of slots 66.

The reduction printer 70 is releasably supported by the mounting block 64. Such mounting is effected by aligning the projections 72 with the slots 66, moving the printer 70 in an axial direction upwardly in FIGURE 4 until the projections are in the grooves 68, and then rotating the printer 70 until projections 72 drop into the radially directed bores 67. Thus, the releasable mounting for the printer 70 by the mounting block 64 is similar to a bayonet type mounting means.

The reduction printer 70, per se, is of conventional construction and includes a printing light source of two different intensities. A cable 74 extends from the printer 70 to any conventional selectively operable triggering device.

The opening on the upper surface of the reduction printer 70 is coaxially aligned with the hollow shafts 54 and 32. A lens 76 is adjustably and releasably coupled in an axial disposition at the upper end of shaft 32. The inner peripheral surface of a bellows 78 is releasably coupled to an outer peripheral portion of the upper end of shaft 32. Bellows 78 may be made from any one of a wide variety of materials including fabric so long as the material will not transmit light therethrough.

An X—Y axis stage device is provided for orientating the master pattern and negative with respect to the reduction printer. Such device includes a support plate member 80 having an axially disposed opening 81. The hub 26 extends into the opening 81. As shown by comparison of FIGURES 3 and 4, the opening 81 is elongated. A bearing guide surface such as that provided by gib 82 is provided with mating bearing surfaces on the plate member 80. The longitudinal axis of gib 82 is parallel to the longitudinal axis of opening 81. Gib 82 is adjustably and releasably supported by the main frame 22. The main frame 22 also includes a way 86 in sliding engagement with a way 84 on the lowermost surface of member 80. See FIGURE 3.

Figure 2:
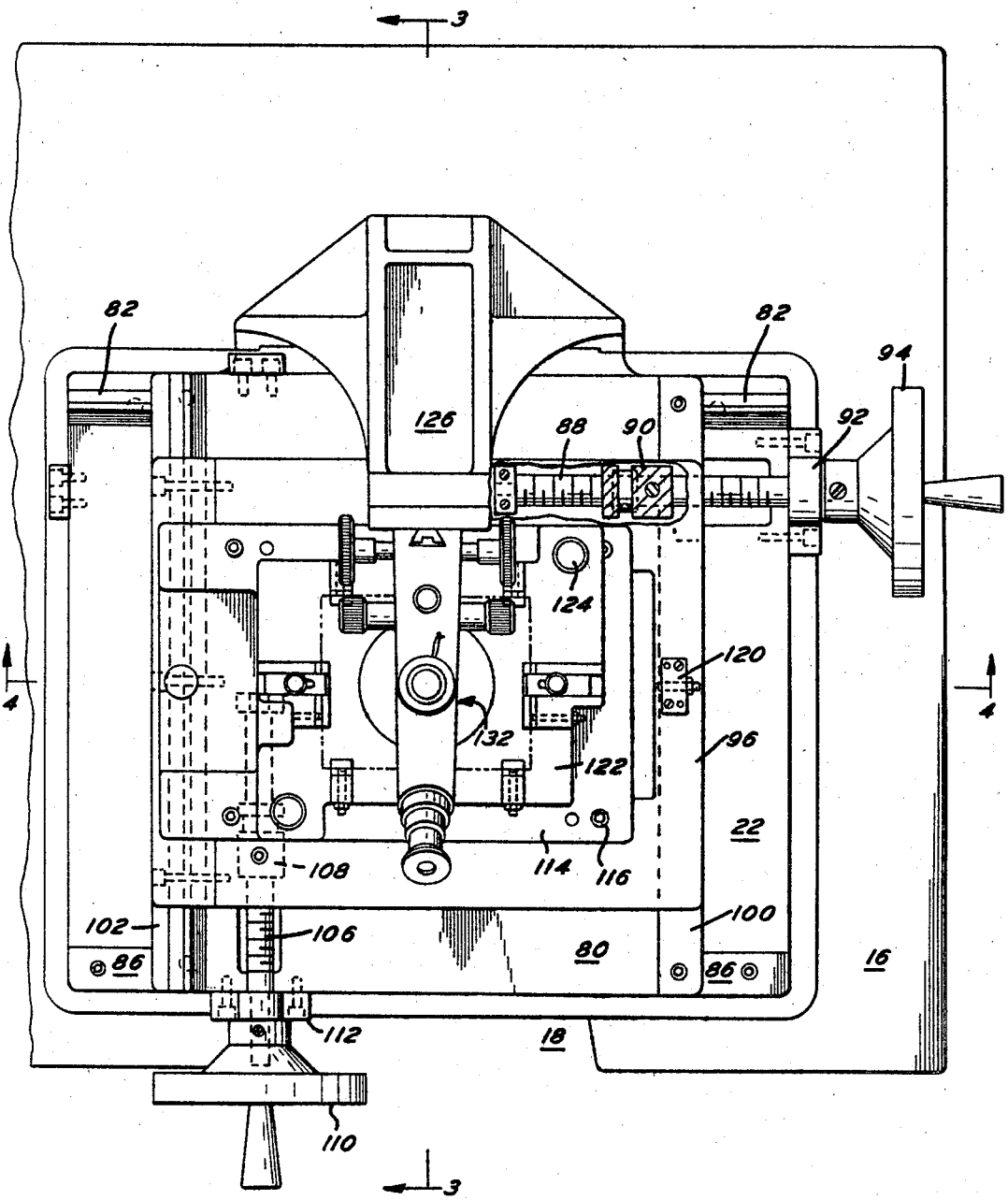
FIGURE 2 is a top plan view of the machine of the present invention.

A threaded shaft 88, as shown more clearly in FIGURE 2, extends parallel to the gib 82. Shaft 88 is threadedly engaged with bearing block 90 which in turn is engaged with member 80. Shaft 88 is also nonthreadedly supported by a collar 92 on the main frame 22 and terminates in a hand wheel 94. Hence, rotation of the hand wheel 94 will cause nonreciprocatory rotative movement for the shaft 88 which in turn will cause reciprocation of the member 80 toward and away from the collar 92 as guided by the gib 82 and the way 86.

The above structure forming a part of the X—Y stage device facilitates movement in the X direction. The elements which effect movement in the Y direction are supported thereby and are as follows. A second support plate member 96 is slidably disposed on the upper surface of the plate member 80 for movement toward and away from the longitudinal axis of the gib 82. Such movement may be effected by means of a gib 102 releasably and adjustably supported on the upper surface of member 80, perpendicular to the longitudinal axis of the shaft 88. A way 100 is provided on the upper surface of member 80 for sliding engagement with a way 98 on the lower surface of member 96. See FIGURES 2 and 4.

The member 96 is provided with a stepped opening at 104. The outer periphery of the bellows 78 is tightly secured to the shoulder in the stepped opening 104. A threaded shaft 106 is threadedly meshed with and supported by a bearing block 108 which in turn is engaged with member 96 by means of a pin and bushing. Collar 112 is releasably supported by the member 80. A hand wheel 10 is coupled to a shaft 106. Hence, shaft 106 will have a rotatable but nonreciprocable type movement effected by rotation of hand wheel 110. Rotating hand wheel 110 will effect reciprocation of member 96 toward and away from the longitudinal axis of gib 82.

A mask plate member 114 is supported on the upper surface of member 96 and coupled thereto by means of a plurality of bolts 116. Member 114 is provided with a centrally disposed aperture in line with the lens 76. A negative holder means 118 is provided. Means 118 is adapted to be slidably supported by the upper surface of member 96 within a recess on the lowermost surface of member 114. Means 118 is shown more clearly in FIGURE 7 and will be described in greater detail hereinafter.

A limit stop 120 is provided on the upper surface of member 96 for adjustably limiting the rearmost position of a face on means 118. A substantially imperforate plate member 122 is adjustably supported on the upper surface of member 114 by means of bolts 124. Except for the bolt holes, member 122 is imperforate as shown more clearly in FIGURE 6. Member 122 will be described in greater detail hereinafter.

As shown more clearly in FIGURE 3, a main support arm 126 is releasably coupled to a rear face on the main frame 22 by means of bolts 125. The arm 126 may be a casting having interconnected longitudinal and transverse ribs as illustrated. The upper front face of the arm 126 removably supports a mounting plate 128. A rack 130 is provided on the plate 128 and equally spaced from the upright side edges thereof. A commercially available microscope 132 with a minimum of 400× magnification is releasably supported by the plate 128 and adapted to be adjusted toward and away from the plane of member 122 by means of a pinion meshed with rack 130 and an adjusting knob 131.

As shown more clearly in FIGURE 9, the artwork support structure 62 includes a slide plate 134. Plate 134 is provided with a recess which removably receives an artwork holder 136. The artwork holder 136 is provided with a recess 139 for removably receiving a slide 138 having a particular printed circuit thereon which is to be reproduced. An adjustable limit stop 140 is provided on the plate 134. Limit stop 140 is adapted to cooperate with the plate 60 and thereby facilitates proper positioning of the artwork with respect to the longitudinal axis of the printer 70. Movement of the artwork support structure 62 is facilitated by a handle in the form of finger grips 142.

As shown more clearly in FIGURE 7, the negative holder means 118 includes a slide plate 146 having a knob 144 thereon. Plate 146 has a recess 147 on its lowermost surface into which the lens 76 may extend. The end of plate 146 remote from the knob 144 is adapted to cooperate with the adjustable limit stop 120.

The plate 146 is provided with an aperture 148 adapted to be positioned in line with the longitudinal axis of the lens 76. An end wall 150 is removably supported on the upper surface of plate 146 so that the combined thickness of plates 146 and wall 150 correspond to the vertical distance between the upper surface of member 96 and the lower surface of the juxtaposed portion of member 114.

The upper surface of plate 146 is provided with grooved channels on opposite sides of the aperture 148. In one of the grooved channels, there are provided locating pins 152 and 152'. In said one channel, there is also provided a locating pin 154. A mating locating pin 154' is provided in the other channel. The pins 152, 152', 154 and 154' form a right triangle. A negative 156 is adapted to be received on the upper surface of the plate 146. A leaf spring 158 biases the negative 156 into engagement with the locating pins 152 and 152'. Leaf spring 160 biases the negative 156 into engagement with the pins 154 and 154'. Negative 156 is preferably a high resolution plate with its emulsion side on its lowermost surface, the same being commercially available from Eastman Kodak Company of Rochester, N.Y. The negative 156 should be removed and inserted only in a darkroom. As shown more clearly in FIGURES 3 and 4, a pair of leaf springs 162 are provided on the undersurface of member 114 to bias the negative 156 downwardly so that the negative will be firmly supported on the plate 146.

In FIGURE 6, there is illustrated the plate member 122 which is adapted to removably support a master pattern holder 164. Plate member 122 is provided with adjustable locating supports 166. Each of the supports 166 are identical. Hence, only one will be described in detail. Support 166 includes a supporting surface 168 and an adjustable locating pin 170. Each of the supporting surfaces 168 receives a corner portion of the pattern holder 164. The pins 170 engage a side face of the pattern holder 164. A pair of biased latches 172 and 174 are provided on opposite sides of the plate member 122 to retain the pattern holder 164 on the surfaces 168.

A pattern 176 is provided on the pattern holder 164. The pattern 176 is preferably vertical and horizontal lines accurately positioned either by printing or etching and having a width of .0002 inch. The microscope 132 has an X and Y axis, otherwise known as fiducial or reticle lines, having a width of .0001 inch. The lines of the master pattern 176 are preferably spaced apart by a minimum distance of 0.001 inch. Hence, the spacing between the lines on the matter pattern 176 is ten times the width of the reticle lines and five times the width of the lines forming the master pattern. Since the reticle lines will be accurately aligned with reduction printer 70 and the lens 76, it is possible to obtain accuracies of 10 microinches in the adjustment of the X—Y stage device with respect thereto.

The operation of the apparatus 10 is as follows:

It will be assumed that holder 138 containing a slide having artwork thereon is supported within the recess 139 and that the structure 62 is mounted as illustrated in FIGURE 3. It will be assumed that the holder means 118 containing the negative 156 is properly positioned as shown more clearly in FIGURE 4. Bolts 124 may be removed thereby facilitating removal of plate member 122 and the structure supported thereby. Thereafter, focusing on the negative position may be accomplished while viewing through the eyepiece 133. Adjustment of focus may be accomplished in the rough by turning knob 42. More accurate adjustment is obtained by turning wheel 56.

Thereafter, plate member 122 is replaced in the position illustrated in the drawings. It is assumed that pattern holder 164 having a master pattern 176 thereon is supported by the plate member 122. Thereafter, hand wheels 94 and 110 are adjusted to orientate the reticle lines of the objective having the proper magnification power selected whereby the reticle lines will be orientated with a particular intersection of lines on the master pattern 176. At this point, it should be noted that the master pattern 176 and the negative 156 are orientated with respect to one another and adjustment of the hand wheels 94 or 110 simultaneously moves both the master pattern and the negative with respect to the lens 76, the objective of the microscope 132, and the artwork. During focusing, a very low intensity light source associated with printer 70 is utilized so as not to expose the photosensitive surface on the negative. When it is desired to expose the image from the artwork projected on the negative, a high intensity light source associated with the printer 70 may be activated by a switch (not shown).

Thereafter, the same artwork may be reproduced on the negative 156 by first moving the negative 156 with respect to the artwork in any desired direction by use of the hand wheels 94 and/or 110. The amount of movement may be controlled by viewing through the eyepiece 133 and correlating the reticle lines with the master pattern 176. Thereafter, the artwork is exposed on the negative again so that the second image on the negative is orientated with respect to the first image and spaced therefrom by a controlled amount which is extremely accurate. If desired, additional images may be likewise exposed on the negative orientated and spaced from the other images any number of times depending on the size of the artwork and the size of the negative. Of course it is possible to substitute different artworks in between different exposure of images. Once the machine 10 is focused, the focusing mechanism need not be adjusted.

When the desired number and location of images have been exposed on the negative 156, the negative should be removed under darkroom conditions. Thereafter, the negative may be developed in the conventional manner.

The accuracy of orientation of one image with respect to another is a function of the width of the lines forming the master pattern 176 and the width of the reticle lines of the microscope 132. As a result of the structural interrelationship of the present invention, different circuits or the same circuit may be accurately exposed on the negative 156. By interchanging the artwork between exposures, one circuit may be exposed on the negative 156 in a particular orientation so that it forms a continuation of another circuit previously exposed on the negative 156.

The artwork may be on a negative or a transparent plate as desired. It will be appreciated that when the negative 156 is operatively disposed as shown in FIGURES 3 and 4, it is subjected to darkroom conditions and that each time an image is exposed, only a small portion of the negative 156 is subjected to the exposing light. Hereinafter, the pattern holder 164 may be referred to as a substrate having a master pattern thereon.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for precisely reproducing artwork on a photosensitive surface comprising magnifying means having a fixed reticle, a projector for projecting an image of artwork onto a photosensitive surface, a movable stage positioned between said reticle and said projector, said stage including a first support for holding a photosensitive surface so that it may be exposed to images projected by said projector, said stage also including a second support for holding a master pattern exposed to observation through said magnifying means, and drive means for moving said stage relative to said reticle to align at least a portion of a master pattern with said reticle.

2. Apparatus in accordance with claim 1 wherein said projector is a reduction printer and said magnifying means is a microscope, a support for said reduction printer, said support including means for moving said reduction printer toward and away from said movable stage.

3. Apparatus in accordance with claim 1 wherein said stage supports an imperforate plate between said first support for holding a photosensitive surface and said second support for holding a master pattern.

4. Apparatus in accordance with claim 1 wherein said guide means includes a mechanism for reciprocably moving said stage along coordinate axes in a plane perpendicular to the optical axis between said reticle and said projector, whereby said reticle, a portion of the master pattern, and said projector may be aligned on a common axis.

5. Apparatus in accordance with claim 1 wherein said first support for holding a photosensitive surface includes a plate removably supported on said stage, and said second support for holding a master pattern includes a plate removably fixed on said stage.

6. Apparatus for precisely reproducing artwork comprising a main frame, a column supported by said frame and extending in an upright direction, a microscope supported adjacent the distal end of said column, adjustment means for focusing said microscope by adjusting the position of at least a part of the microscope relative to said column, a movable stage mounted on said frame, drive means for adjusting the position of said stage along coordinate axes, said stage including a first support for holding a photosensitive surface thereon, said stage including a second support for holding a master pattern thereon, said photosensitive surface and master pattern being supported on said stage to be viewed from opposite directions, said microscope including a reticle, a reduction printer positioned to project an image on said photosensitive surface, reduction printer support means including reduction printer adjustment means for moving said reduction printer toward and away from said stage, and a holder for supporting artwork to be projected by said printer onto a photosensitive surface.

7. Apparatus in accordance with claim 6 wherein said master pattern includes a grid having lines of uniform width, the reticle having a width less than the width of the lines of said grid.

8. Apparatus in accordance with claim 6 including an imperforate plate on said stage between said first and second supports.

9. Apparatus for precisely reproducing artwork on a photosensitive surface comprising magnifying means having a fixed reticle above a movable stage, a movable stage positioned below said magnifying means, a projector for projecting an image of artwork onto a photosensitive surface, said projector being positioned below said movable stage and being positively orientated with respect to the optical axis of said reticle, artwork retaining means for supporting artwork in a position for projection of an image thereof onto a photosensitive surface, said movable stage including a first support for holding a photosensitive surface on a lower side thereof so that it may be exposed to images projected by said projector, said stage also including a second support for holding a master pattern adjacent the upper surface of said stage so that it may be exposed to observation through said magnifying means, an imperforate plate member positioned between said first and second means, and drive means for moving said stage relative to said reticle to align at least a portion of a master pattern with said reticle.

10. Apparatus in accordance with claim 9 wherein said master pattern is a grid having straight lines thereon, the width of said lines being uniform and greater than the width of the reticle lines.

11. Apparatus in accordance with claim 9 wherein said magnifying means is a microscope and said projector is a reduction printer.

12. A method for precisely reproducing artwork comprising the steps of positively orientating a master pattern having a plurality of grid lines thereon with the artwork to be reproduced, positively orientating a photosensitive surface with respect to the master pattern, physically adjusting the position of the master pattern and photosensitive surface as a unit while observing the grid lines on the master pattern through a magnifier, aligning the grid lines on the master pattern with a reticle in the magnifier, and then exposing the photosensitive surface to the artwork by projecting an image of the artwork onto the photosensitive surface.

13. Apparatus for precisely reproducing artwork on a photosensitive surface comprising a frame, a column supported by said frame and extending in an upright direction, a microscope supported adjacent the distal end of said column, adjustment means for focusing said microscope by adjusting the position of at least a part of the microscope relative to said column, a movable stage mounted on said frame, drive means for adjusting the position of said stage along coordinate axes, said stage including a first support for holding a photosensitive surface thereon, said stage including a second support for holding a master pattern thereon, said photosensitive surface and master pattern being supported on said stage to be viewed from opposite directions, said microscope including a reticle, an imperforate plate member positioned between said first and second support, a shaft reciprocably held on said frame opposite the side of said stage which includes said first support, shaft drive means for effecting selective reciprocation thereof, a reduction printer support means fixed to said shaft, a reduction printer in said support means, and a holder for supporting artwork to be projected by said printer onto a photosensitive surface.

References Cited

UNITED STATES PATENTS

| 3,192,844 | 7/1965 | Szasz et al. | 95—73 |
| 3,220,331 | 11/1965 | Evans et al. | 95—73 |

NORTON ANSHER, *Primary Examiner.*

R. A. WINTERCORN, *Assistant Examiner.*